(12) United States Patent
Ho

(10) Patent No.: US 8,362,656 B2
(45) Date of Patent: Jan. 29, 2013

(54) POWER ADAPTER WITH LOW POWER LOSS

(75) Inventor: Yu-Hua Ho, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 296 days.

(21) Appl. No.: 12/862,775

(22) Filed: Aug. 25, 2010

(65) Prior Publication Data

US 2011/0304415 A1  Dec. 15, 2011

(30) Foreign Application Priority Data

Jun. 14, 2010  (CN) .................. 2010 2 0226743 U

(51) Int. Cl.
*H01H 3/26* (2006.01)

(52) U.S. Cl. ..................... 307/140; 439/39; 335/205

(58) Field of Classification Search .................. 307/140; 439/39; 335/205
See application file for complete search history.

(56) References Cited

U.S. PATENT DOCUMENTS

| | | | | |
|---|---|---|---|---|
| 6,250,931 B1 * | 6/2001 | Mendelson | ....................... | 439/39 |
| 6,781,493 B1 * | 8/2004 | Gorginians | ..................... | 335/293 |
| 7,146,256 B2 * | 12/2006 | Hibi et al. | ...................... | 700/286 |
| 7,311,526 B2 * | 12/2007 | Rohrbach et al. | ............... | 439/39 |
| 7,351,066 B2 * | 4/2008 | DiFonzo et al. | ................ | 439/39 |
| 7,467,948 B2 * | 12/2008 | Lindberg et al. | ................ | 439/38 |
| 7,637,024 B2 * | 12/2009 | Amundson et al. | .......... | 33/355 R |
| 7,641,477 B2 * | 1/2010 | DiFonzo et al. | ................ | 439/39 |
| 7,645,143 B2 * | 1/2010 | Rohrbach et al. | ............... | 439/39 |
| 7,706,152 B2 * | 4/2010 | Shen et al. | ....................... | 363/15 |
| 7,733,202 B2 * | 6/2010 | Feil et al. | ........................ | 335/179 |
| 7,750,771 B2 * | 7/2010 | Yamada et al. | ................ | 335/205 |
| 7,751,898 B2 * | 7/2010 | Ibrahim et al. | ................... | 607/57 |
| 7,767,919 B2 * | 8/2010 | Zusman | .................. | 200/61.45 R |
| 7,834,725 B2 * | 11/2010 | Pizzuto | ........................... | 335/205 |
| 7,874,844 B1 * | 1/2011 | Fitts, Jr. | ............................ | 439/39 |
| 7,901,216 B2 * | 3/2011 | Rohrbach et al. | ............... | 439/39 |
| 7,963,773 B2 * | 6/2011 | Palli et al. | ........................ | 439/38 |
| 8,087,939 B2 * | 1/2012 | Rohrbach et al. | ............... | 439/39 |
| 8,177,560 B2 * | 5/2012 | Rohrbach et al. | ............... | 439/39 |
| 8,198,861 B2 * | 6/2012 | Kudou | ............................ | 320/114 |
| 2002/0046891 A1 * | 4/2002 | Honda et al. | ................... | 180/220 |
| 2002/0075108 A1 * | 6/2002 | Ward et al. | ..................... | 335/205 |
| 2002/0105400 A1 * | 8/2002 | Underwood et al. | ......... | 335/205 |
| 2002/0113676 A1 * | 8/2002 | Nishikawa | ...................... | 335/205 |
| 2003/0067373 A1 * | 4/2003 | Wieger et al. | .................. | 335/205 |
| 2003/0155889 A1 * | 8/2003 | Howard et al. | ................ | 320/113 |
| 2004/0077187 A1 * | 4/2004 | Belongia et al. | ................. | 439/39 |
| 2006/0082429 A1 * | 4/2006 | Lynch et al. | .................... | 335/205 |
| 2006/0114087 A1 * | 6/2006 | Deng | ............................... | 335/205 |
| 2007/0018956 A1 * | 1/2007 | Kim et al. | ....................... | 345/156 |
| 2007/0072443 A1 * | 3/2007 | Rohrbach et al. | ............... | 439/39 |
| 2007/0072474 A1 * | 3/2007 | Beasley et al. | ................. | 439/332 |

(Continued)

*Primary Examiner* — Jared Fureman
*Assistant Examiner* — Alfonso Perez Borroto
(74) *Attorney, Agent, or Firm* — Altis Law Group, Inc.

(57) ABSTRACT

A power adapter includes a power converter circuit, a direct current (DC) plug and a magnetic switch. The power converter circuit converts power signals of a power source into DC power signals. The DC plug is engageable with a jack of a powered device, and transmits the DC power signals to the powered device. The DC plug includes a magnetic force conducting wire to conduct magnetic force of a magnetic element when the powered device is powered. The magnetic switch, connected between the power source and the power converter circuit, is turned on or off according to if the magnetic force conducting wire conducts the magnetic force or not so as to control the power source to provide power to the power converter circuit.

5 Claims, 4 Drawing Sheets

U.S. PATENT DOCUMENTS

| | | | |
|---|---|---|---|
| 2007/0230227 A1* | 10/2007 | Palmer | 363/78 |
| 2007/0291514 A1* | 12/2007 | Shen et al. | 363/15 |
| 2008/0096398 A1* | 4/2008 | Rohrbach et al. | 439/39 |
| 2008/0166915 A1* | 7/2008 | Kendall et al. | 439/527 |
| 2008/0211310 A1* | 9/2008 | Jitaru et al. | 307/72 |
| 2008/0280461 A1* | 11/2008 | DiFonzo et al. | 439/39 |
| 2009/0068948 A1* | 3/2009 | Jubelirer | 455/41.3 |
| 2009/0111287 A1* | 4/2009 | Lindberg et al. | 439/39 |
| 2009/0179495 A1* | 7/2009 | Yeh | 307/66 |
| 2009/0206800 A1* | 8/2009 | Kudou | 320/162 |
| 2010/0233889 A1* | 9/2010 | Kiani et al. | 439/39 |
| 2010/0302757 A1* | 12/2010 | Bennett, Jr. | 361/819 |
| 2011/0143556 A1* | 6/2011 | Hsu | 439/39 |
| 2012/0178271 A1* | 7/2012 | Rohrbach et al. | 439/39 |

* cited by examiner

POWER ADAPTER WITH LOW POWER LOSS

BACKGROUND

1. Technical Field

The disclosure relates to power adapters, and particularly to a power adapter with low power loss.

2. Description of Related Art

A plurality of electronic devices, such as, modems and set top boxes, require power adapters to receive commercial power to work. A power adapter usually includes a power converter unit and a direct current (DC) plug. The DC plug connects to electronic devices, and the power converter unit includes an alternating current (AC) plug to connect to commercial power jack. When the electronic devices are powered off, the power adapters are still plugged into the commercial power jack, which results in a trickle of power loss.

DETAILED DESCRIPTION

Figure 1:
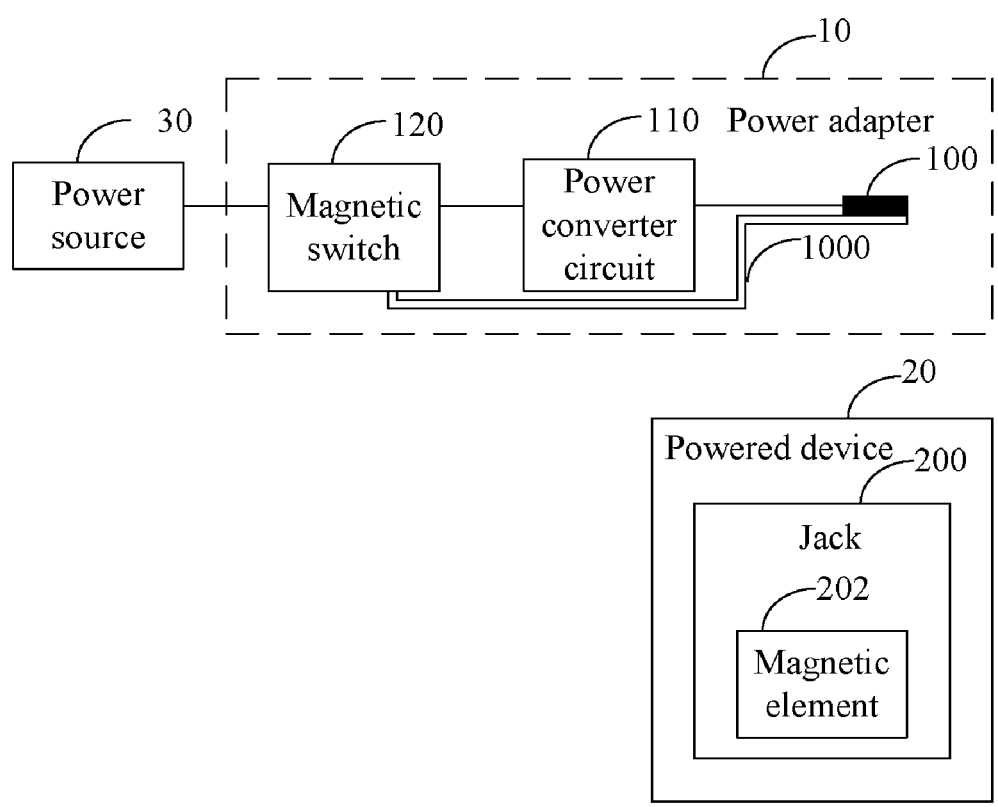
FIG. 1 is a schematic diagram of an embodiment of a power adapter as disclosed and a powered device.

FIG. 1 is a schematic diagram of an embodiment of a power adapter 10 as disclosed and a powered device 20. The power adapter 10 is connected between a power source 30 and a powered device 20, and converts power signals of the power source 30 to direct current (DC) power signals suitable for driving the powered device 20. The power adapter 10 includes a DC plug 100, a power converter circuit 110, and a magnetic switch 120. The powered device 20 includes a jack 200 including a magnetic element 202. In one embodiment, the magnetic element 202 may be a magnetic element exhibiting ferromagnetism.

The power converter circuit 110 converts the power signals of the power source 30 to DC power signals suitable for driving the powered device 20. The DC plug 100 is connected to the power converter circuit 100, and is engageable with the jack 200 of the powered device 20. The DC plug 100 transmits the DC power signals to the powered device 20, and includes a magnetic force conducting wire 1000. The magnetic force conducting wire 100 is connected to the DC plug 100 and the magnetic switch 120. The magnetic force conducting wire 1000 conducts magnetic force of the magnetic element 202 of the powered device 20 to the magnetic switch 120 when the powered device 20 is powered. (It means that when the powered device 20 is powered, that is, the DC plug 100 is inserted in the jack 200, the magnetic force conducting wire 100 transmit magnetic force of the magnetic element 202 to the magnetic switch 120.)

In this embodiment, the magnetic element 202 can be included in the jack 200. When the powered device 20 needs power, the DC plug 100 is inserted in the jack 200. At this time, the magnetic force conducting wire 1000 contacts with the magnetic element 202, so the magnetic force conducting wire 1000 conducts magnetic force to the magnetic switch 120. When the powered device 20 is not being used, the DC plug 100 is pulled out from the jack 200. At this time, there is no contact between the magnetic force conducting wire 1000 and the magnetic element 202, so the magnetic force conducting wire 1000 conducts no magnetic force. In one embodiment, the magnetic force conducting wire 1000 is attached to a ground of the DC plug 100, and may be ferromagnetic wire.

Figure 3:
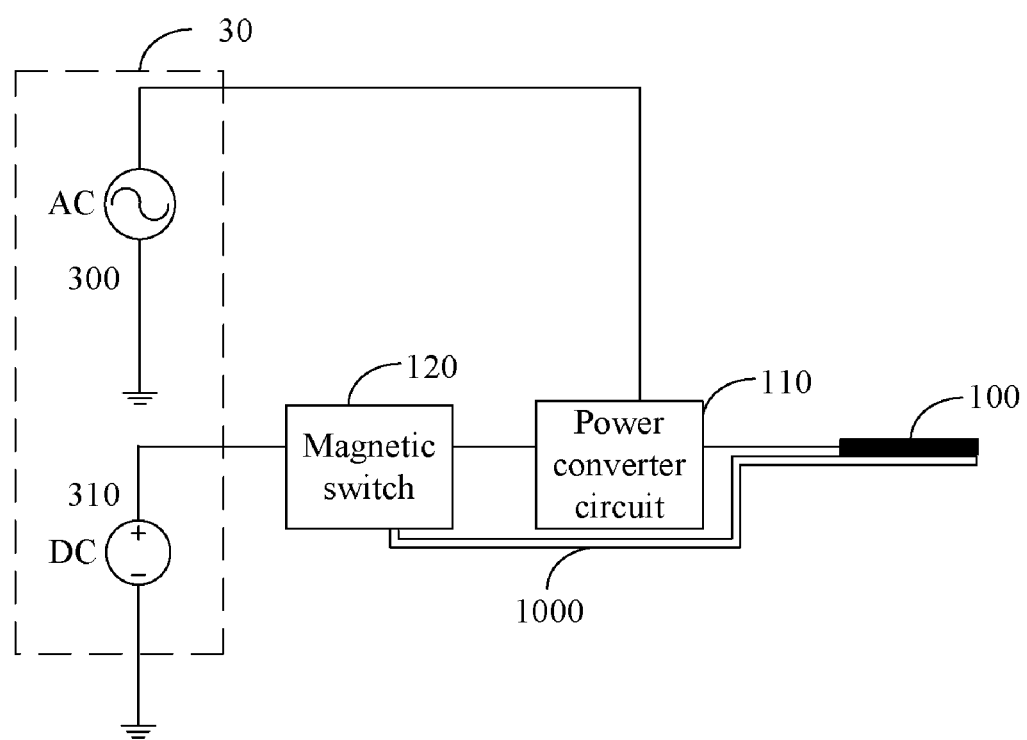
FIG. 3 is a schematic diagram of an embodiment of a power adapter as disclosed.
Figure 4:
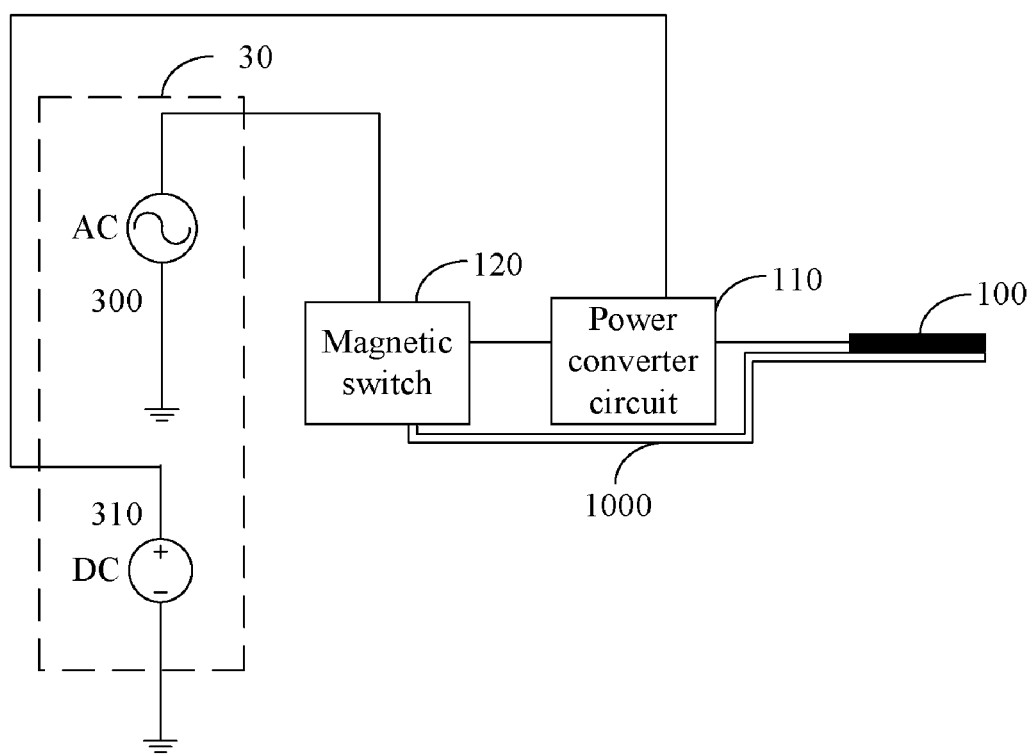
FIG. 4 is a schematic diagram of another embodiment of a power adapter as disclosed.

The magnetic switch 120 is connected between the power source 30 and the power converter circuit 110, and is turned on or off according to if the magnetic force conducting wire 1000 conducts the magnetic force or not, so as to control the power source 30 to provide power to the power converter circuit 110. FIGS. 3 and 4 are two embodiments of connections of the magnetic switch 120. In FIGS. 3 and 4, the power source 30 includes an alternating current (AC) power source 300 and a DC power source 310. The AC power source 300 provides commercial power of 110/220V. The DC power source 310 provides working voltage to the power converter circuit 110 to allow the power converter circuit 110 to convert the commercial power into suitable DC power signals. In one exemplary embodiment, the magnetic switch 120 may be reed relay. It should be understood that the magnetic switch 120 may be other magnetic induction elements.

As shown in FIG. 3, the AC power source 300 is directly connected to the power converter circuit 110, and the DC power source 310 is connected to the power converter circuit 110 through the magnetic switch 120. When the powered device 20 needs power, the DC plug 100 is inserted in the jack 200, and the magnetic force conducting wire 1000 conducts magnetic force to the magnetic switch 120. At this time, the magnetic switch 120 is turned on. Thus, the DC power source 310 provides working voltage to the power converter circuit 110, and the power converter circuit 110 converts the commercial power of the AC power source 300 to DC power signals suitable for driving the powered device 20. When the powered device 20 is not being used, the DC plug 100 is pulled out from the jack 200. At this time, the magnetic force conducting wire 1000 conducts no magnetic force, and the magnetic switch 120 is turned off. Thus, the DC power source 310 provides no power to the power converter circuit 110, and the power converter circuit 110 does not work, which decreases power loss of the power adapter 10 in standby mode.

As shown in FIG. 4, the AC power source 300 is connected to the power converter circuit 110 through the magnetic switch 120, and the DC power source 310 is directly connected to the power converter circuit 110. When the powered device 20 needs power, the DC plug 100 is inserted in the jack 200, and the magnetic force conducting wire 1000 conducts magnetic force to the magnetic switch 120. At this time, the magnetic switch 120 is turned on. Thus, the DC power source 310 provides working voltage to the power converter circuit 110, and the power converter circuit 110 converts the commercial power of the AC power source 300 to DC power signals suitable for driving the powered device 20. When the powered device 20 is not being used, the DC plug 100 is pulled out from the jack 200. At this time, the magnetic force conducting wire 1000 conducts no magnetic force, and the magnetic switch 120 is turned off. Thus, the AC power source 300 provides no power to the power converter circuit 110 for conversion, and the power converter circuit 110 nearly has no power loss.

Figure 2:
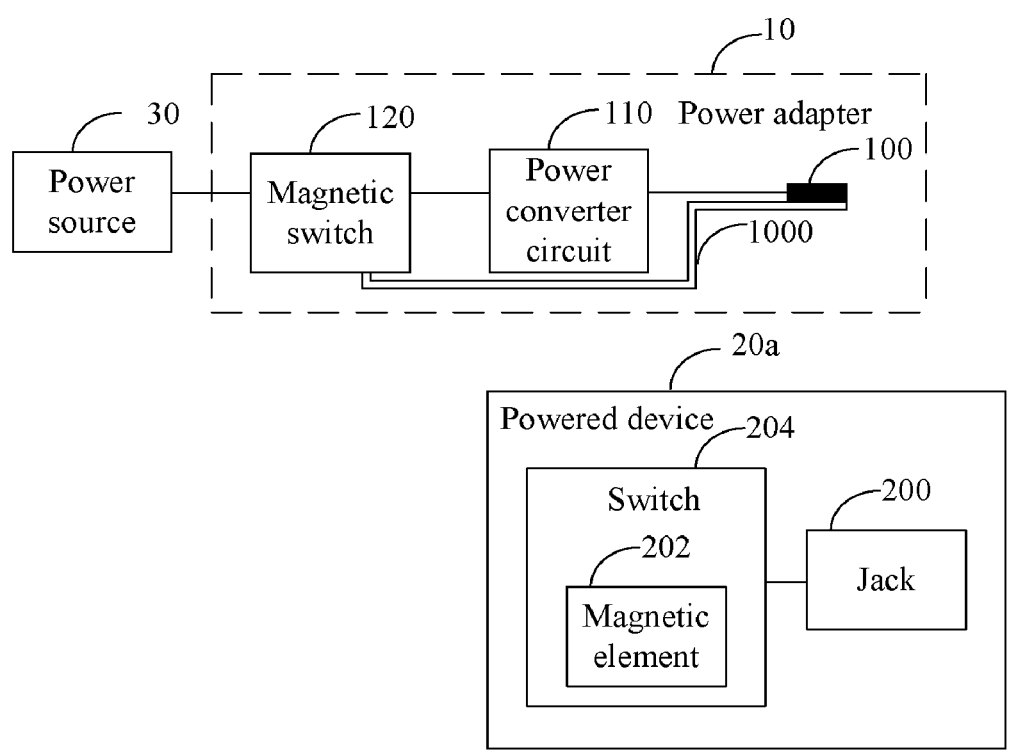
FIG. 2 is a schematic diagram of another embodiment of a power adapter as disclosed and a powered device.

FIG. 2 is a schematic diagram of another embodiment of the power adapter 10 as disclosed and a powered device 20a. In this embodiment, the power adapter 10 is the same as that of FIG. 1, and the connections of the magnetic switch 120 also have two embodiments as shown in FIGS. 3 and 4. The powered device 20a includes a jack 200 and a switch 204 connected to the jack 200, and the switch 204 includes a magnetic element 202.

When the powered device 20a needs power, the switch 204 is powered on. At this time, magnetic force of the magnetic element 202 is conducted to the magnetic switch 120 via the jack 200 and the magnetic force conducting wire 1000. At this time, the magnetic switch 120 is turned on. Thus, the DC power source 310 provides working voltage to the power converter circuit 110, and the power converter circuit 110 converts the commercial power of the AC power source 300 to DC power signals suitable for driving the powered device 20a. When the powered device 20a is not being used, the switch 204 is turned off, and there is no connection between the magnetic element 202 and the jack 200. Therefore, the magnetic force conducting wire 1000 conducts no magnetic force, and the magnetic switch 120 is turned off. At this time, the power converter circuit 110 does not work, which decreases power loss of the power adapter 10 in standby mode.

The power converter circuit 110 as shown in FIGS. 1 to 4 includes a control integrated circuit (IC), such as, a pulse width modulation controller. The control IC includes a power pin and an enable pin, and the magnetic switch 120 may be connected to either the power pin or the enable pin.

The power adapter 10 uses the magnetic switch 120 and the magnetic force conducting wire 1000 to determine if the powered devices 20 and 20a need power. When there is no need for power, the magnetic switch 120 is turned off to disconnect the power source 30 and the power adapter 10, which decreases the power loss of the power adapter 10. In addition, the power adapter 10 can be achieved with existed circuit designs, resulting in lower cost. Furthermore, there is no need for physical contact to control the magnetic switch 120, so the power adapter 10 has a high safety factor.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A power adapter, connected between a power source and a powered device comprising a jack comprising a magnetic element, the power adapter comprising:
    a power converter circuit, operable to convert power signals of the power source into direct current (DC) power signals suitable for driving the powered device;
    a DC plug connected to the power converter circuit and engageable with the jack of the powered device, operable to transmit the DC power signals to the powered device, the DC plug comprising a magnetic force conducting wire to conduct magnetic force of the magnetic element when the powered device is powered, wherein the magnetic force conducting wire is ferromagnetic wire; and
    a magnetic switch connected between the power source and the power converter circuit, operable to be turned on or off according to if the magnetic force conducting wire conducts the magnetic force or not, so as to control the power source to provide power to the power converter circuit.

2. The power adapter of claim 1, wherein the magnetic force conducting wire is attached to a ground of the DC plug.

3. The power adapter of claim 1, wherein the magnetic switch is connected between a DC power source of the power source and the power converter circuit.

4. The power adapter of claim 1, wherein the magnetic switch is connected between an alternating current power source and the power converter circuit.

5. A power adapter, connected between a power source and a powered device comprising a jack and a magnetic element, the power adapter comprising:
    a power converter circuit, operable to convert power signals of the power source into direct current (DC) power signals suitable for driving the powered device;
    a DC plug connected to the power converter circuit and engageable with the jack of the powered device, operable to transmit the DC power signals to the powered device, the DC plug comprising a magnetic force conducting wire to conduct magnetic force of the magnetic element when the powered device is powered, wherein the magnetic force conducting wire is ferromagnetic wire; and
    a magnetic switch connected between the power source and the power converter circuit, operable to be turned on if the magnetic force conducting wire conducts the magnetic force and operable to be turned off if the magnetic force conducting wire not conducts the magnetic force, so as to control the power source to provide power to the power converter circuit.

* * * * *